(12) United States Patent
Meyer et al.

(10) Patent No.: US 6,584,575 B1
(45) Date of Patent: Jun. 24, 2003

(54) SYSTEM AND METHOD FOR INITIALIZING SOURCE-SYNCHRONOUS DATA TRANSFERS USING RATIO BITS

(75) Inventors: Deriick R. Meyer, Austin, TX (US); Philip Enrique Madrid, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/490,307

(22) Filed: Jan. 24, 2000

Related U.S. Application Data

(63) Continuation-in-part of application No. 09/428,633, filed on Oct. 27, 1999, now Pat. No. 6,505,261, which is a continuation-in-part of application No. 09/386,650, filed on Aug. 31, 1999, now Pat. No. 6,393,502.

(51) Int. Cl.[7] .............................. G06F 1/12; G06F 3/00
(52) U.S. Cl. ......................... 713/400; 713/500; 710/58
(58) Field of Search ............................... 713/400, 500; 710/58, 129

(56) References Cited

U.S. PATENT DOCUMENTS

| | | | |
|---|---|---|---|
| 3,725,793 A | | 4/1973 | Phillips |
| 4,929,854 A | | 5/1990 | Iino et al. |
| 4,970,405 A | | 11/1990 | Hagiwara |
| 4,989,175 A | | 1/1991 | Boris et al. |
| 5,058,132 A | | 10/1991 | Li |
| 5,256,994 A | | 10/1993 | Langendorf |
| 5,307,381 A | | 4/1994 | Ahuja |
| 5,459,855 A | * | 10/1995 | Lelm ........................ 713/400 |
| 5,572,716 A | * | 11/1996 | Meisner ...................... 713/500 |
| 5,774,001 A | * | 6/1998 | Mozdzen et al. ........... 327/141 |
| 5,909,563 A | * | 6/1999 | Jacobs ........................ 710/129 |
| 5,935,255 A | * | 8/1999 | So et al. ..................... 713/400 |
| 6,108,778 A | * | 8/2000 | LaBerge ........................ 713/1 |
| 6,112,307 A | * | 8/2000 | Ajanovic et al. ............ 713/400 |
| 6,269,136 B1 | * | 7/2001 | Hansen et al. ............... 375/354 |
| 6,393,502 B1 | * | 5/2002 | Meyer et al. ................. 710/58 |
| 6,457,137 B1 | * | 9/2002 | Mitchell et al. ............. 713/400 |
| 6,505,261 B1 | * | 1/2003 | Meyer et al. ................. 710/58 |

OTHER PUBLICATIONS

*Alpha Microprocessors SROM Mini–Debugger, User's Guide*, Apr. 1999, Compaq Computer Corp., Chapter 2, pp. 1–5; Chapter 3, pp. 1–38.
*Alpha 21264 Microprocessor Hardware Reference Manual*, Jul. 1999, Compaq Computer Corp., Chapter 7, pp. 1–21; Chapter 11, pp. 1–7.
*Digital Semiconductor Alpha 21164PC Microprocessor, Hardware Reference Manual*, Sep. 1997, Digital Equipment Corp., Chapter 4, pp. 8–10; Chapter 7, pp. 1–13.
*Alpha 21164 Microprocessor Hardware Reference Manual*, Dec. 1998, Compaq Computer Corp., Chapter 4, pp. 6–11; Chapter 7, pp. 1–14.

* cited by examiner

*Primary Examiner*—Thomas Lee
*Assistant Examiner*—Chun Cao
(74) *Attorney, Agent, or Firm*—Meyertons Hood Kivlin Kowert & Goetzel, P.C.; B. Noël Kivlin

(57) ABSTRACT

A system and method for initializing deterministic source-synchronous transfers between devices in a computer system using one or more ratio bits to indicate a ratio between clocks. In an exemplary computer system, one or more processors are each coupled to a bridge. The one or more ratio bits are used to indicate a ratio between the system clock of a first device, such as a processor, and the system clock of a second device, such as the bridge. Each device may also operate at a multiple of its system clock. Once the one or more ratio bits have been stored, the first device can determine when edges of its operating clock correspond to edges of the operating clock of the second device. The use of the one or more ratio bits may advantageously allow devices in the computer system to operate on different system clocks without dedicated signal lines or pins to indicate the frequencies of those different system clocks.

9 Claims, 14 Drawing Sheets

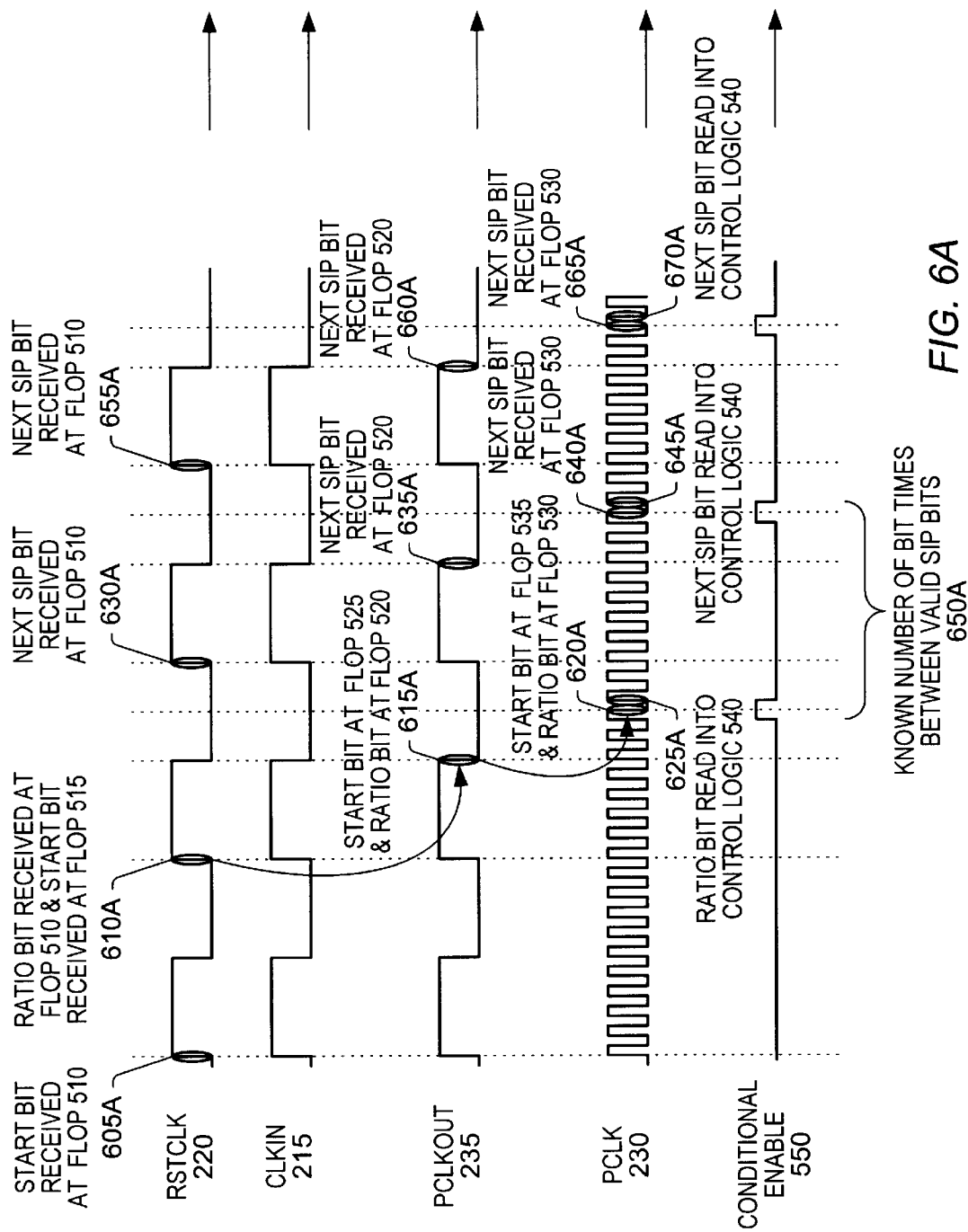

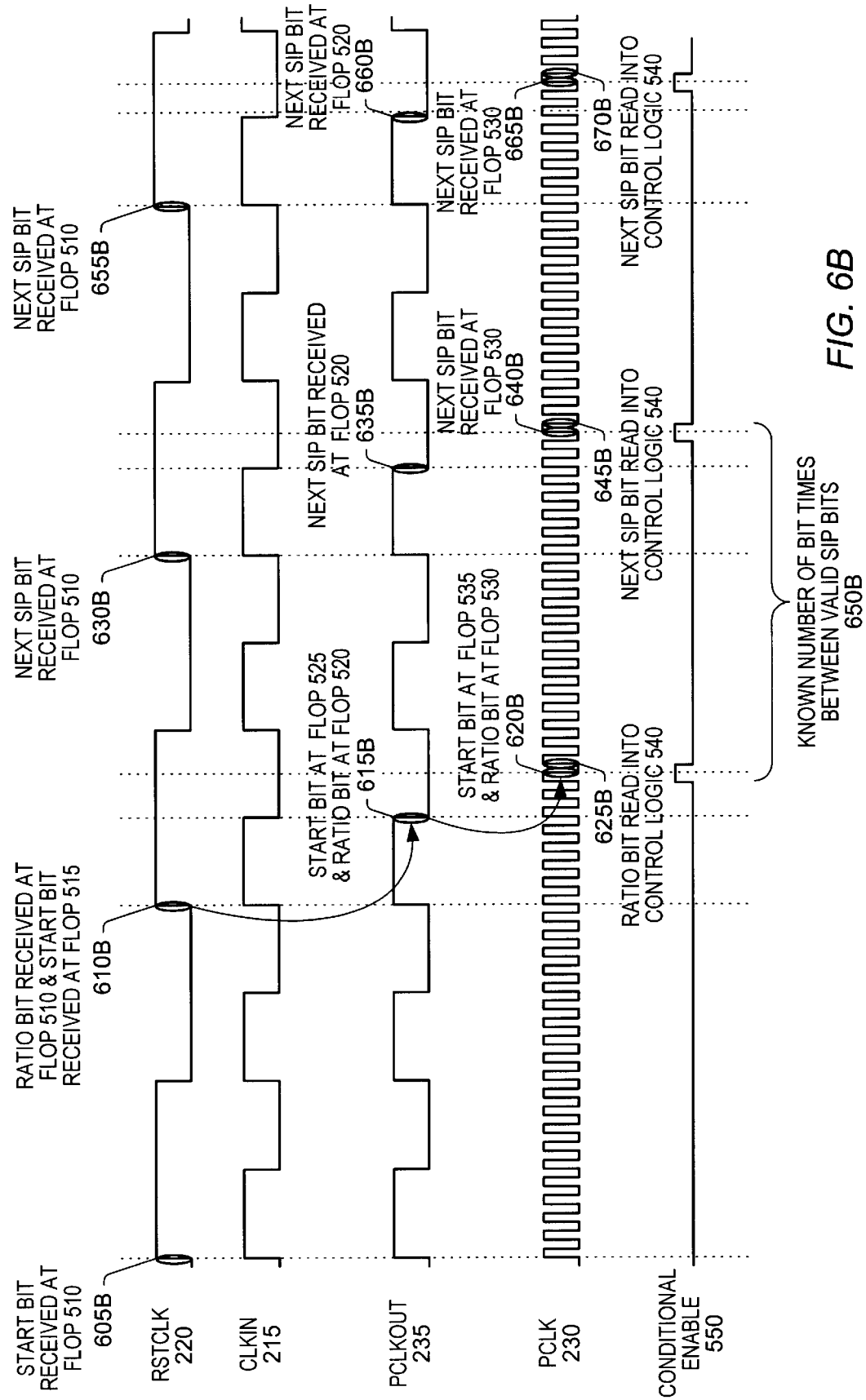

SYSTEM AND METHOD FOR INITIALIZING SOURCE-SYNCHRONOUS DATA TRANSFERS USING RATIO BITS

This application is a continuation-in-part of U.S. patent application Ser. No. 09/428,633, filed Oct. 27, 1999, now U.S. Pat. No. 6,505,261 entitled "System and Method for Initiating an Operating Frequency using Dual-Use Signal Lines", whose inventors are Derrick R. Meyer and Philip Enrique Madrid, and is also a continuation-in-part of U.S. Pat. No. 6,393,502, filed Aug. 31, 1999, entitled "System and Method for Initiating a Serial Data Transfer Between Two Clock Domains", whose inventors are Derrick R. Meyer and Philip Enrique Madrid."

BACKGROUND OF THE INVENTION

1. Field of the Invention

This invention relates to data communications, and more particularly to a system and method for initiating source-synchronous or clock-forwarded transfers, using a ratio bit such as may be transferred in a serial data stream.

2. Description of the Related Art

In computer systems, especially computer systems including devices that may operate according to differing internal clocks with different clock rates, some mechanism is needed to assure that devices are initialized to their proper clock rate. For example, a processor in a computer system must be initialized to its operating frequency clock rate. Typically, a system clock that operates at a relatively slow clock frequency is used as a timing reference for the computer system.

One solution to initializing devices in computer systems is either to operate at the system clock rate or to operate at a predetermined multiple of the system clock rate. The computer system may be designed so that each device in the computer system operates at a fixed multiple of the system clock rate. One problem that arises is that certain devices in the computer system, such as processors, may operate at one or more different clock rates based on which processor is included in the computer system. It may also be desirable to allow for upgrading the processor or other device to one that operates according to a faster clock rate than originally designed.

Another solution is to have each device, or subset of devices, operate at a local clock rate that is a different multiple of the system clock rate. This technique may allow for different devices, such as processors, memory, input/output buses, etc., to operate at an optimal local clock rate. One problem that arises is that data transfers between devices that operate according to different clock rates are between clock domains. Data transfers between clock domains require that either a clock signal is shared by both the sending and the receiving devices, e.g. a synchronous transfer, or a clock signal is forwarded with the data, e.g. a source-synchronous or clock-forwarded transfer. One problem with synchronous transfers is that clock skew may become unmanageable as the clock frequency increases.

What is needed is a system and method for initializing source-synchronous transfers in a computer system. It would be desirable for the system and method to use a minimum amount of resources of the computer system.

SUMMARY OF THE INVENTION

The problems outlined above may be in large part solved by a system and method for initializing deterministic source-synchronous transfers between devices in a computer system using one or more ratio bits to indicate a ratio between clocks. In an exemplary computer system, one or more processors are each coupled to a bridge. The one or more ratio bits are used to indicate a ratio between the system clock of a first device, such as a processor, and the system clock of a second device, such as the bridge. Each device may also operate at a multiple of its system clock. Once the one or more ratio bits have been stored, the first device can determine when edges of its operating clock correspond to edges of the operating clock of the second device. The use of the one or more ratio bits may advantageously allow devices in the computer system to operate on different system clocks without dedicated signal lines or pins to indicate the frequencies of those different system clocks.

Broadly speaking, a method is contemplated, for initializing deterministic data transfers between a first device and a second device. The first device operates according to at least a first clock having a first clock rate. The second device operates according to at least a second clock having a second clock rate. The ratio between the second clock rate and the first clock rate is an integer number greater than or equal to one. The method comprises the first device receiving a serial data stream that includes at least one ratio bit, wherein the ratio bit is encoded with the ratio between the second clock rate and the first clock rate. The first device uses the ratio bit to determine an edge of the second clock. The first device transmits a first source-synchronous clock to the second device on the edge of the second clock. The method may advantageously allow for the source-synchronous clocking to be initialized without a negotiation protocol between the first device and the second device. In one embodiment, the second device transmits a second source-synchronous clock to the first device on the edge of the second clock. In another embodiment, the method may further include the second device signaling the first device. The signaling may indicate that the second device is ready to receive source-synchronous transfers.

A computer system is also contemplated. The computer system comprises a memory configured to store initialization information for the computer system, logic coupled to the memory for transmitting the initialization information, at least one processor coupled via a serial line to the logic, and a device coupled to the processor. The initialization information includes at least one ratio bit, where the ratio bit is encoded with the ratio between a first clock having a first clock rate and a second clock having a second clock rate. The processor is coupled to receive the first clock and the second clock and to operate according to the second clock. The ratio between the second clock rate and the first clock rate is an integer greater than or equal to one. The device is configured to operate according to the first clock rate. The logic is configured to transmit the initialization information over the serial line to the processor, and the processor is configured to decode the ratio bit to determine the first clock rate. The processor and the device are configured to exchange data using source-synchronous clocks that are initialized using the ratio bit to determine a common clock edge.

BRIEF DESCRIPTION OF THE DRAWINGS

Other objects and advantages of the invention will become apparent upon reading the following detailed description and upon reference to the accompanying drawings in which:

FIG. 6A is an exemplary timing diagram of an embodiment of operations of the system of FIG. 5 when the sending device is clocked at base clock rate that is equal to the receiving device;

FIG. 6B is an exemplary timing diagram of an embodiment of operations of the system of FIG. 5 when the sending device is clocked at base clock rate that is one-half the base clock rate of the receiving device;

Figure 1:
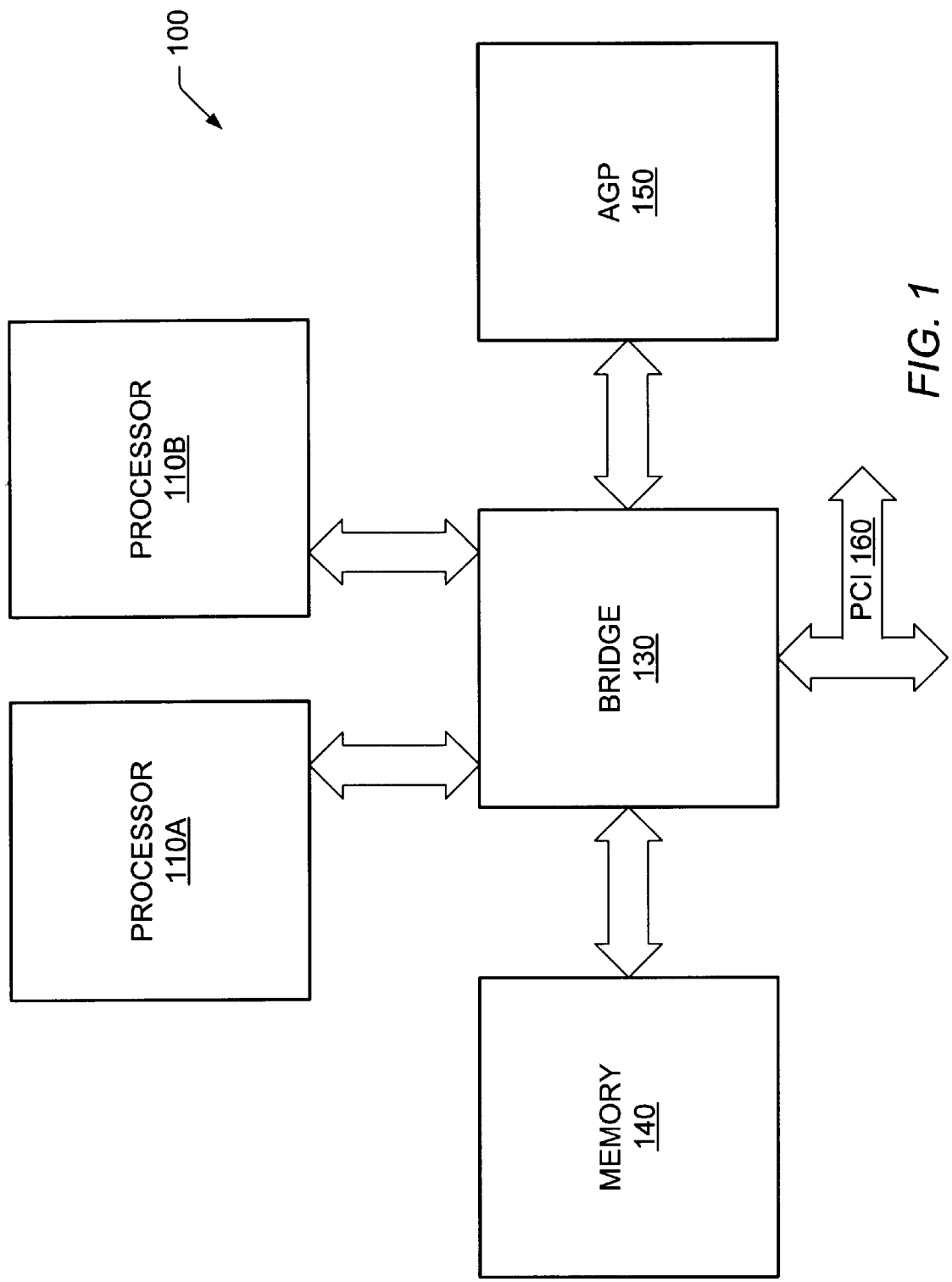
FIG. 1 is a block diagram of an embodiment of a computer system including two processors with separate buses coupling the processors to a bridge.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning to FIG. 1, a block diagram of an embodiment of a generalized computer system 100 is illustrated. A first processor 110A and a second processor 110B each couple to a bridge 130 through separate processor buses. Both the first processor 110A and the second processor 110B are preferably configured to perform memory and I/O operations using their respective processor buses. In one embodiment, processors 110A and 110B implement the x86 instruction set architecture. Other embodiments may implement any suitable instruction set architecture. The bridge 130 is further coupled to a memory 140. The memory 140 is preferably configured to store data and instructions accessible to both the first processor 110A and the second processor 110B, as well as other system devices. The memory 140 may be comprised of SDRAM (Synchronous Dynamic Random Access Memory), RDRAM (Rambus DRAM) [RDRAM and RAMBUS are registered trademarks of Rambus, Inc.], or any other suitable memory type. An advanced graphics port device (AGP) 150 is also optionally coupled to the bridge 130. As shown, a Peripheral Component Interconnect (PCI) bus 160 is also coupled to the bridge 130. A variety of I/O components may be coupled to the PCI bus 160.

It is noted that in embodiments of the computer system 100 including a legacy bus, such as an Industry Standard Architecture (ISA) bus, the bridge 130 is often referred to an a northbridge 130, with the bridge (not shown) between the PCI bus 160 and the legacy bus referred to as a southbridge. It is also noted that in the illustrated embodiment, the bridge 130 is the system master for the computer system 100. While the illustrated embodiment includes two processors 110A and 110B, it is noted any number of processors 110 may be included in the computer system 100 as desired.

In the illustrated embodiment, as the system master, the bridge 130 operates to coordinate communications between processors 110A and 110B, the memory 140, and the AGP device 150, as well as devices coupled to the PCI bus, etc. The bridge 130 maintains coherency for data transfers among the devices of the computer system 100 by probing processor 110A and/or processor 110B for memory locations accessed by the other processor 10A or 110B, the AGP device 150, or a PCI device on the PCI bus 160, etc.

Figure 2:
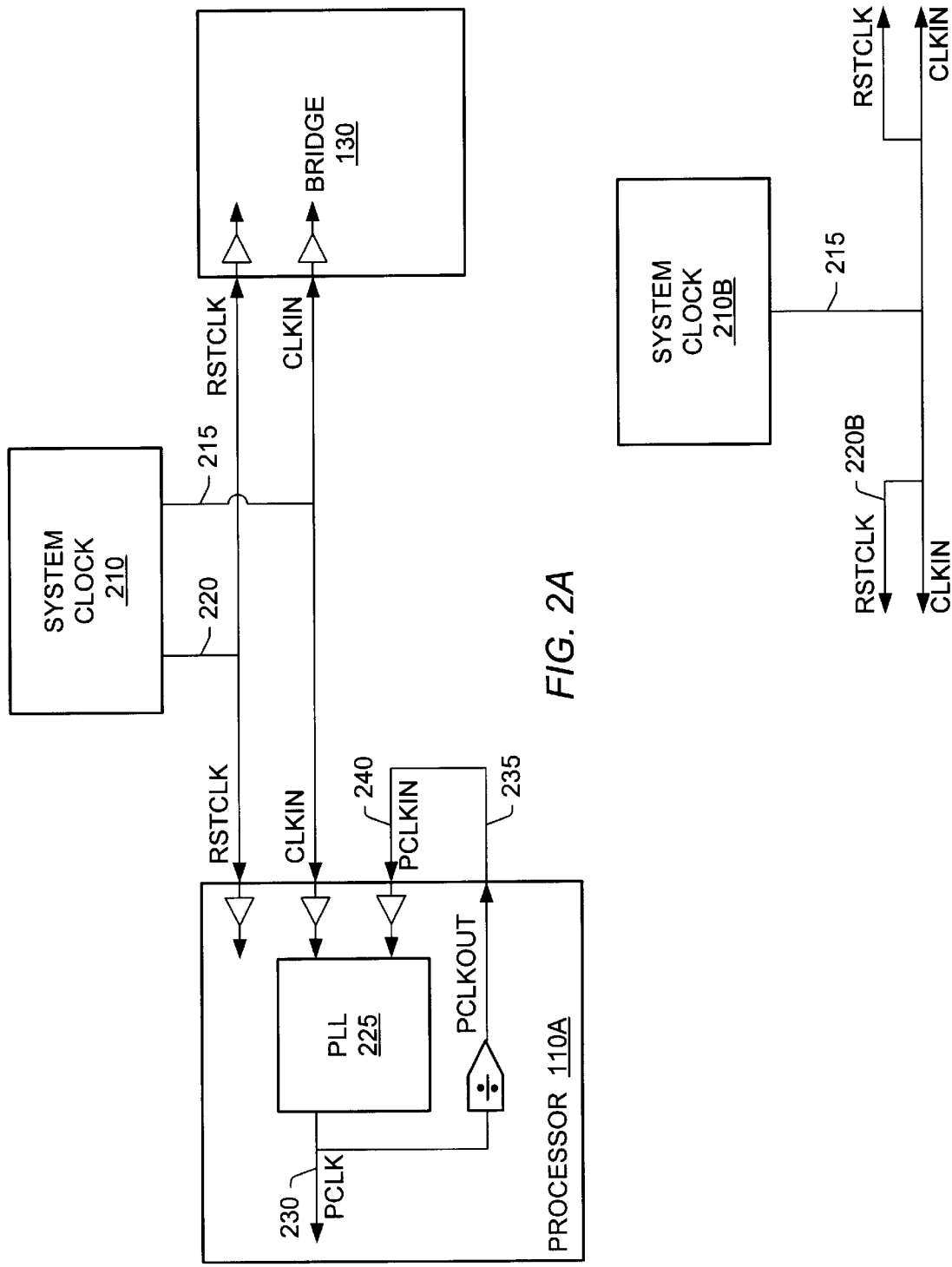
FIG. 2A is a block diagram of an embodiment of one of the processors and the bridge of FIG. 1 configured to accept two system clock signals from a system clock.
FIG. 2B is a block diagram of an alternative embodiment of the system clock of FIG. 2A, where the system clock provides a single clock signal over more than one clock line.

Turning now to FIG. 2A, a block diagram of an embodiment of one of the processors 110A and the bridge 130 of FIG. 1 are illustrated. As shown, a system clock 210 is coupled to provide a first system clock CLKIN 215 and a second system clock RSTCLK 220 to each of the processor 110A and the bridge 130. The bridge 130 is shown operating according to at least one of the two system clocks, CLKIN 215 and/or RSTCLK 220. The processor 110A receives the RSTCLK 220 and the CLKIN 215. Processor 110A inputs first system clock CLKIN 215 into a PLL 225 and generates a processor clock PCLK 230. Processor clock PCLK 230 preferably operates at a frequency that is a multiple of the first system clock CLKIN 215. The processor clock signal PCLK 230 is divided by a constant value to create PCLK-OUT 235, which is routed out of the processor 110A and back into the processor 110A as PCLKIN 240. The constant value used to divide the processor clock signal PCLK 230 to create PCLKOUT 235 is preferably the same as the multiple used to create the processor clock signal PCLK 230 from the first system clock CLKIN 215. PCLKIN 240 is used as the feedback clock signal for the PLL 225.

Thus, the system clock 210 may provide two clock signals to each of the processor 110A and the bridge 130. In one embodiment, RSTCLK 220 has a clock rate of 50 MHz. In this embodiment, CLKIN 215 has a clock rate 100 MHz. PLL 225 of processor 110A operates to generate a processor clock 230 with a clock rate of 500 MHz. The division element divides the processor clock 230 by 5 to generate PCLKOUT 235 at 100 MHz. PCLKIN 240 also has a clock rate of 100 MHz. It is noted that bridge 130 may operate according to the 50 MHz RSTCLK 220, the 100 MHz clock CLKIN 215, or may implement a PLL, such as PLL 225 of processor 110A, to generate, for example, an internal clock at almost any frequency. Synchronous data transfers to initialize the computer system are used to guarantee that the initialization data sent by the sender and the initialization data received by the receiver agree.

Turning now to FIG. 2B, a block diagram of an alternative embodiment of the system clocking of FIG. 2A is shown. In this embodiment, the system clock 210 provides a single clock signal over more than one clock line. As shown, system clock 210B outputs a system clock 215 that is routed as both CLKIN 215 and RSTCLK 220B. Thus, in one embodiment both RSTCLK 220B and CLKIN 215 have a clock rate of 100 MHz.

It is noted that the ratio between CLKIN 215 and RSTCLK 220 is preferably an integer greater than or equal to one. Thus, the ratio between CLKIN 215 and RSTCLK 220 may be 1, 2, 3, etc. It is also noted that in a preferred embodiment, there is a minimal phase difference between a rising edge of CLKIN 215 and a corresponding rising edge of RSTCLK 220.

Figure 3:
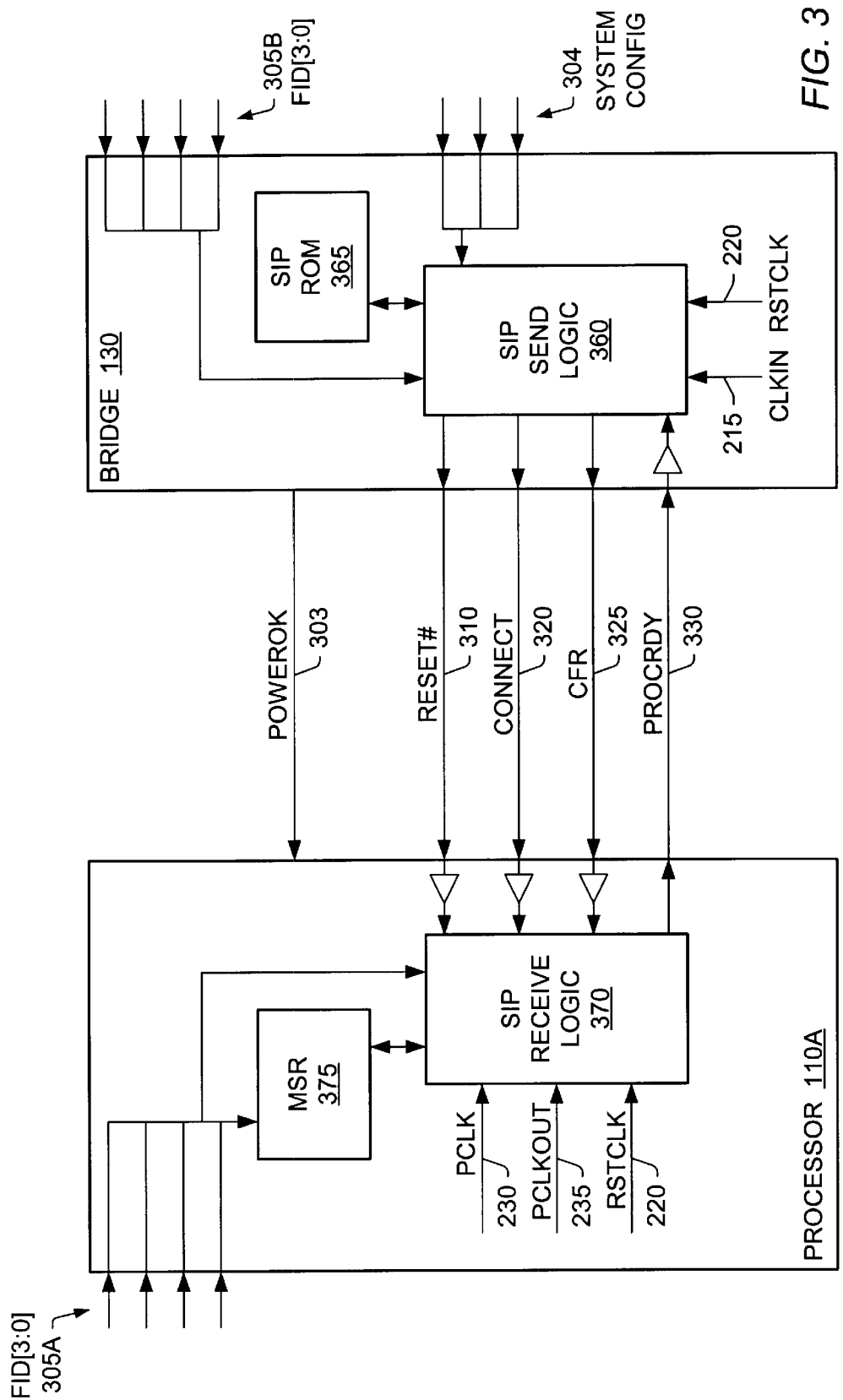
FIG. 3 is a block diagram of an embodiment of one of the processors and the bridge of FIG. 1, including input signals to the processor and the bridge as well as exemplary signals exchanged between the processor and the bridge, wherein the bridge includes a ROM for storing configuration data.

Turning now to FIG. 3, a block diagram of an embodiment of one of the processors 110A and the bridge 130 of FIG. 1 is illustrated. The exemplary details of the processor 110A, as shown in FIG. 3, include inputs of a processor clock frequency ratio, shown as FID[3:0] 305a, a model specific register (MSR) 375, and a SIP receive logic 370. Also as illustrated, bridge 130 accepts inputs for the processor clock frequency ratio, FID[3:0] 305B, inputs for system configuration 304, a SIP ROM 365, and SIP send logic 360. The bridge 130 also sends a PowerOK signal 303 to the processor 110A during initialization after the power to the system has stabilized at the operating voltage $V_{cc}$ and CLKfN 215 is being received with good clock edges. In a preferred embodiment, the PowerOK signal 303 transitions from low to high.

As shown, the SIP send logic 360 of the bridge 130 receives CLKIN 215 and RSTCLK 220. The SIP send logic 360 is also coupled to receive the FID[3:0] 305 values, the system configuration data 304, as well as data read from the SIP ROM 365.

Also as shown, the SIP receive logic 370 accepts PCLK 230, PCLKOUT 235, and RSTCLK 220 as inputs, as well as the processor clock frequency ratio FID[3:0] 305 and values read from MSR 375. The FID[3:0] 305 values are input to the MSR 375 as well as provided to the SIP receive logic 370. It is noted that the SIP ROM 365 may include a plurality of configuration sets. In one embodiment, the SIP ROM 365 is indexed by the length of the motherboard to which the bridge 130 is attached and by the frequency ID FID[3:0] values. Other methods of indexing a particular configuration set for retrieval from the plurality of configurations stored in the SIP ROM 365 are also contemplated.

The SIP send logic 360 outputs, as shown, RESET#310, CONNECT 320, and CFR (Clock Forward Reset) 325. Each of RESET#310, CONNECT 320, and CFR 325 are buffered into processor 110A and provided to the SIP receive logic 370. The SIP receive logic 370 provides the PROCRDY 330 signal to the bridge 130, where the PROCRDY signal 330 is provided to the SIP send logic 360.

Figure 4:
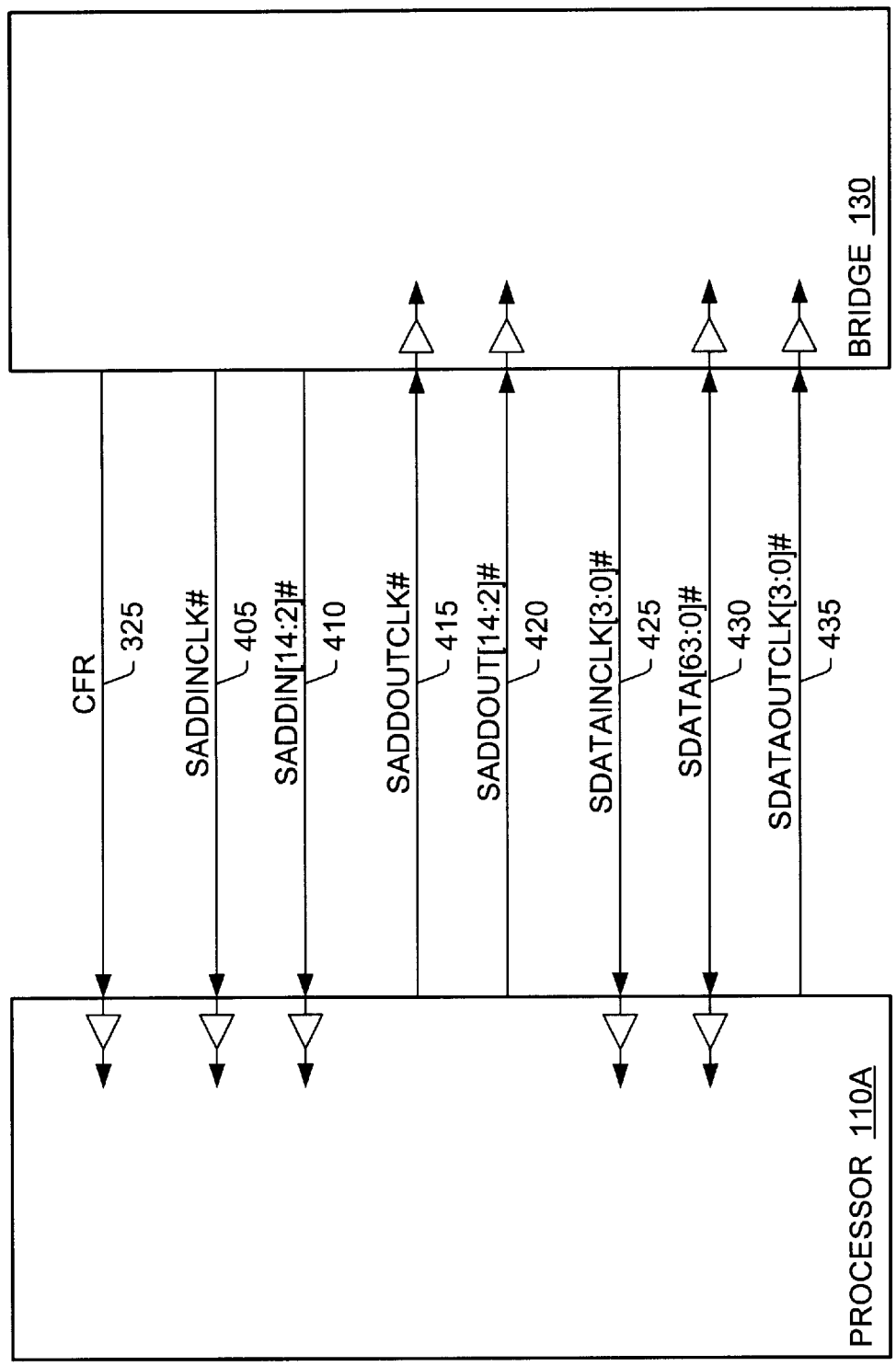
FIG. 4 is a block diagram of an embodiment of one of the processors and the bridge of FIG. 1, including exemplary address, data, and control signals exchanged between the processor and the bridge.

Turning now to FIG. 4, an embodiment of one of the processors 110A and the bridge 130 of FIG. 1 is shown. Also shown are exemplary address, data, and control signals exchanged between the processor 110A and the bridge 130. The CFR signal 325 is sent from the bridge 130 to processor 110A, where the CFR signal 325 is buffered into the processor 110A. Address in lines SADDIN[14:2]# 410 are provided from the bridge 130 to the processor 110A. A corresponding source-synchronous clock line SADDIN-CLK# 405 is provided to clock the data on the SADDIN [14:2]# address lines 410. Likewise, the address out lines SADDOUT[14:2]# 420 are provided from the processor 110A to the bridge 130. Corresponding address out clock line SADDOUTCLK# 415 is provided to clock the address on the SADDOUT[14:2]# address lines 420. As illustrated, 64 data lines, which make up the SDATA[63:0]# 430 lines, bi-directionally transmit data between the processor 110A and the bridge 130. A plurality of data in clock lines SDATAINCLK[3:0]# 425 provide clocking for data transferred from the bridge 130 to the processor 110A. In a similar fashion, data out clock lines SDATAOUTCLK[3:0]# 435 provides clocking for data transferred out over the SDATA lines 430 from the processor 110A to the bridge 130. Similarly to previous figures, all lines are buffered into the destination device, either the processor 110A or the bridge 130, as shown in FIG. 4.

Figure 5:
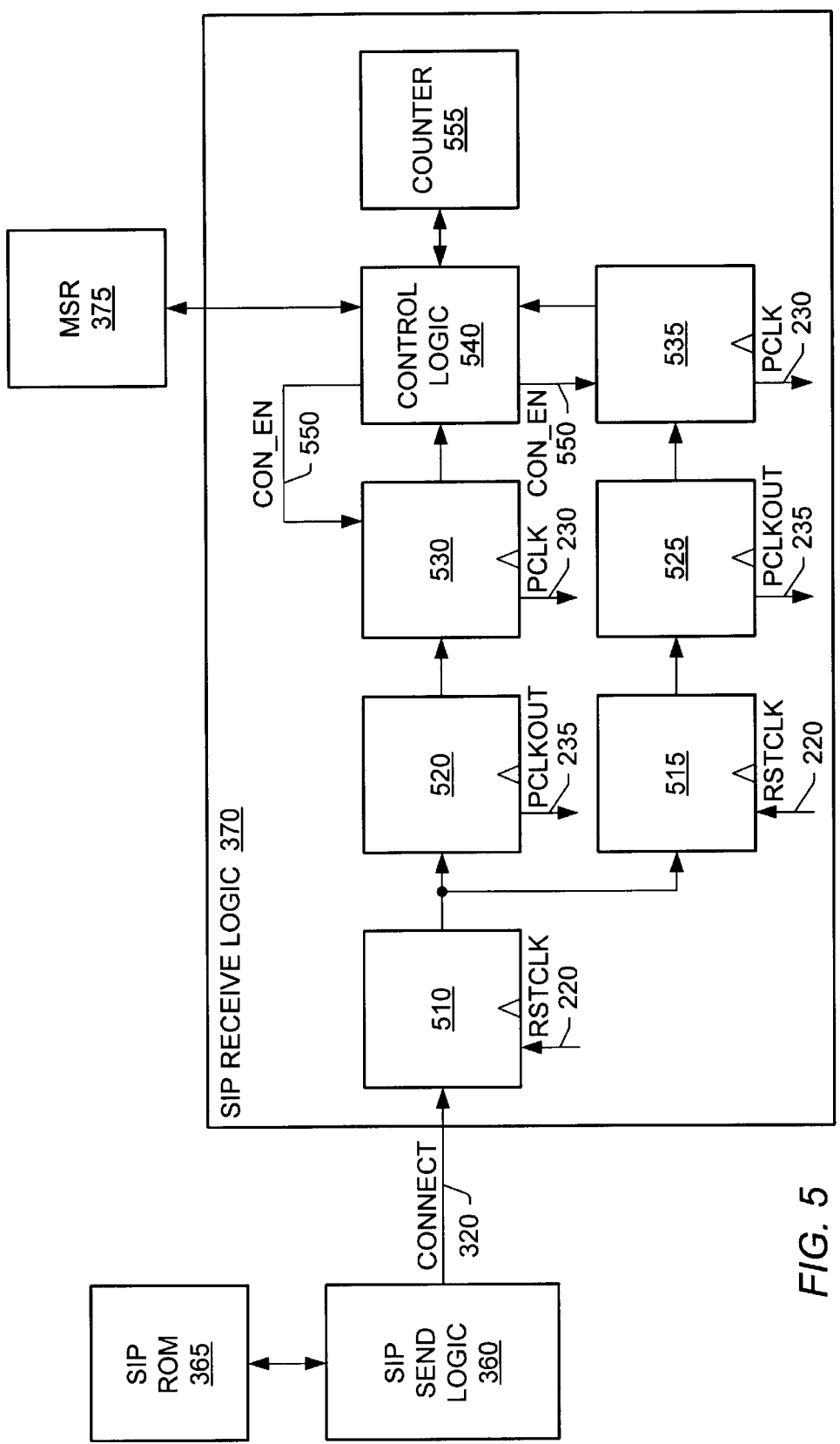
FIG. 5 is a block diagram of an embodiment of a system for transferring a serial data stream from one device to another device, when the sending device and the receiving device operate according to different internal clocks.

Turning now to FIG. 5, a block diagram of an embodiment of a system for transferring a serial data stream from one device to another device is illustrated where the sending device operates according to a different internal clock than the receiving device. In a preferred embodiment, the ratio between the faster clock and the slower clock is an integer greater or equal to 1. As shown in FIG. 5, data stored in a SIP ROM 365 is transferred to and from SIP send logic 360. SIP send logic 360 is coupled to SIP receive logic 370 over connect line 320. As shown, SIP receive logic 370 includes a first storage element 510, such as a flop, which preferably clocked on a rising edge of RSTCLK 220. Data output from storage element 510 is provided to storage element 520 and the storage element 515. The storage element 515 latches the data in preferably on a rising edge of RSTCLK 220. Storage element 520 preferably latches in data on a falling edge of PCLKOUT 235.

Data output by storage element 515 is latched into storage element 525 preferably on a falling edge of PCLKOUT 235. Data output from storage element 525 is clocked into storage element 535 preferably on a falling edge of PCLK 230. Data stored in storage element 520 is provided to storage element 530. Storage element 530, preferably latches in data from the falling edge of PCLK 230. Storage elements 530 and 535 are each enabled by conditional enable signal 550 provided by control logic 540. Upon latching data, storage elements 530 and 535 provide their data to the control logic 540.

Control logic 540 is further coupled to a counter 555 that is configured to count clock edges for control logic 540. Data provided to the control logic 540 may be stored in machine specific registers MSR 375 as desired. As shown, control logic 540 is also configured to read data from the MSR 375.

Generally speaking, a serial data stream stored in the SIP ROM 365 is read by the SIP send logic 360 and provided to the SIP receive logic 370 over connect line 320. A preferred embodiment of the SIP stream includes a start bit followed subsequently by a ratio bit, which is then followed by the remaining bits in the SIP stream. The SIP receive logic 370 latches the start bit into storage element 510 on a rising edge of RSTCLK 220. The SIP receive logic 370 then latches the start bit in storage element 515 concurrently with latching in the ratio bit in storage element 510. Both storage elements 510 and 515 prefer the latch on the rising edge RSTCLK 220. The start bit is latched into storage element 525 on the falling edge of PCLKOUT 235 concurrently with the ratio bit being latched into storage element 520.

In a similar fashion, a start bit is latched into storage element 535, the ratio bit is latched to the storage element 530. The control logic 540 is configured to enable storage in storage elements 530 and 535 during the appropriate edge of the processor clock (PCLK 230). The control logic 540 monitors the output of storage element 535 for the start bit and concurrently decodes the ratio bit from storage element 530 upon receiving the start bit from storage element 535. The ratio bit is stored in the MSR 375. The control logic is further configured to use the ratio bit to configure counter 555 for timing of the next enablement of the conditional enable line 550. Additional details on the timing and flow of the method of transferring the SIP data stream between the SIP send logic 360 and the SIP receive logic 370 over connect line 320 are given below with respect to FIGS. 6A and 6B.

FIG. 6A is an exemplary timing diagram of an embodiment of the operations of the system shown in FIG. 5 when the sending device is clocked at a base clock rate that is equal to the clock rate of the receiving device. Shown in FIG. 6A are RSTCLK 220, CLKIN 215, PCLKOUT 235, PCLK 230, and the conditional enable signal 550. As shown, RSTCLK 220, CLKIN 215 and PCLKOUT 235 operate according to equal clock rates. In other words, RSTCLK 220 and CLKIN 215 have a ratio of 1. PCLK 230 is illustrated with a clock rate 10 times the rate of CLKIN 215. This value of 10 corresponds to the decode of the processor clock ratio FID[3:0], which was discussed above and will be further discussed below.

On a rising edge of RSTCLK 220, start bit is received at storage element 510 (reference numeral 605A). On a next rising edge of RSTCLK 220, a ratio bit is received at storage element 510 concurrently with the start bit being received by storage element 515 (reference numeral 610A). The start bit is received at storage element 525 and the ratio bit is received at storage element 520 on the next falling edge of PCLKOUT 235 (reference numeral 615A).

A predetermined time later, as determined by the control logic 540 shown in FIG. 5, the start bit is latched in the storage element 535 and the ratio bit is latched into storage element 530 (reference numeral 620A). On the next edge of PCLK 230, the ratio bit is read into control logic 540 (reference numeral 625A). It is noted that the conditional enable signal 550 is asserted for a predetermined period of time subsequent to the start bit being latched into storage element 525 and the ratio bit being latched into storage element 520, as shown in reference numeral 615A. As illustrated, the conditional enable signal 550 is asserted for one clock period.

It is noted that the ratio bit being read into control logic 540 and reference numeral 625A decodes with a value of 1. Thus, as in the illustrated embodiment, a known number of bit times will occur between valid SIP bits as shown in reference numeral 650A. In the illustrated embodiment, that number of bit times is equal to the processor ratio 10 multiplied by the ratio bit 1 multiplied by 2 bit times per clock period. Thus, there are approximately 20 bit times between valid SIP bits (reference numeral 650). It is noted that the bit times are preferably measured with respect to PCLK 230, although other clock edges may be used as desired. In a preferred embodiment, the delay between the falling edge of PCLKOUT 235 (reference numeral 615A) and the falling edge of PCLK 230 (reference numeral 620A) is at least 4 PCLK phases (or bit times, as shown).

On a next rising edge of RSTCLK 220 the next SIP bit is received into storage element 510 (reference numeral 630A). On the next falling edge of PCLKOUT 235, the next SIP bit is received at storage element 520 (reference numeral 635A). The known number of bit times between the valid SIP bits later (reference numeral 650A), the condition enable signal 550 is asserted and the next SIP bit is latched into storage element 530 (reference numeral 640A). On the next edge of PCLK 230, the next SIP bit is read into the control logic 540 (reference numeral 645A).

On a next rising edge of RSTCLK 220 the next SIP bit is received into storage element 510 (reference numeral 655A). On the next falling edge of PCLKOUT 235, the next SIP bit is received at storage element 520 (reference numeral 660A). The known number of bit times between the valid SIP bits later (reference numeral 650A), the condition enable signal 550 is asserted and the next SIP bit is latched into storage element 530 (reference numeral 665A). On the next edge of PCLK 230, the next SIP bit is read into the control logic 540 (reference numeral 670A).

The SIP bits are read into the SIP receive logic 370 one bit at a time in a corresponding fashion until the end of the SIP data stream. In a preferred embodiment, the total number of bits in the SIP data stream is predetermined. In other embodiments, a control signal or predetermined data sequence may be used to terminate the SIP data stream.

Turning now to FIG. 6B, an exemplary timing diagram of another embodiment of the operations of a system of FIG. 5 are illustrated. As shown, the sending device it clocked at a base clock rate that is one half the base clock rate of the receiving device. In FIG. 6B, CLKIN 215 and PCLKOUT 235 are shown with the same clock rate as were previously seen in FIG. 6A. PCLK 230 is also shown with the same processor clock ratio of 5 as seen in FIG. 6A. RSTCLK 220, however, is shown with a clock period that is twice that of CLKIN 215.

SIP data stream transfer between SIP send logic 360 and SIP send logic 370 occurs as follows in FIG. 6B. Start bit received at storage element 510 on a rising edge of RSTCLK 220 (reference numeral 605B). The ratio bit is received at storage element 510 concurrently with the start bit latched into storage element 515 on the next rising edge of RSTCLK 220 (reference numeral 610B). On the next falling edge of PCLKOUT 235, start bit is latched in the storage element 525 and the ratio bit is latched in the storage element 520 (reference numeral 615B).

A predetermined amount of time after the falling edge of PCLKOUT 235, the start bit is latched into storage element 535 and a ratio bit is latched in storage element 530 (reference numeral 620B). The condition enable signal 550 is asserted appropriate for latching the start bit and the ratio bit the appropriate time after the falling edge of PCLKOUT 235, similar to what is shown in FIG. 6A. On the next edge of PCLK 230, the ratio bit is read into the control logic 540 (reference numeral 625B). As before, the control logic 540 preferably stores the ratio bit in MSL 375 and uses the ratio bit to activate the counter such that the condition enable signal can be asserted at the appropriate bit time to read the next valid SIP bit. Now knowing the ratio bit value, the control logic 540 is configured to determine the known number of bit times between valid SIP bits as shown (reference numeral 650).

The calculation, as before, involves the processor clock ratio value 10 multiplied by the ratio bit which is 2 in this example, multiplied by the 2 edges per clock. Thus, approximately 40 bit times are illustrated between the edge of PCLK

230 upon which the SIP bits are read into the control logic 540 as shown at reference numeral 650B.

On the next rising edge of RSTCLK 220, the next SIP bit is received at storage element 510 (reference numeral 630B). On the next falling edge of PCLKOUT 235 the next SIP bit is latched into storage element 520 (reference numeral 635B). After the predetermined delay, the next SIP bit is clocked into storage element 530 when the conditional enable 550 is asserted (reference numeral 640B). On the next edge of PCLK 230, the next SIP bit is read into control logic 540 (reference numeral 645B).

Likewise, additional SIP bits are received and latched into storage element 510 (reference numeral 655B) on the rising edges of RSTCLK 220. The additional SIP bits are further received at storage element 520 (reference numeral 660B) on the subsequent falling edge of PCLKOUT 235 (reference numeral 660B). Again, after the predetermined period of time (see reference numeral 650B) has passed, the additional SIP bits are received at storage element 530 (reference numeral 655B), on a falling edge of PCLK 230. The additional SIP bits are read into the control logic 540 on the subsequent rising edge of PCLK 230 (reference numeral 670B). The conditional enable 550 is asserted by the control logic 540 the appropriate number of bit times since the previous valid SIP bit (see reference numeral 650B).

Figure 7:
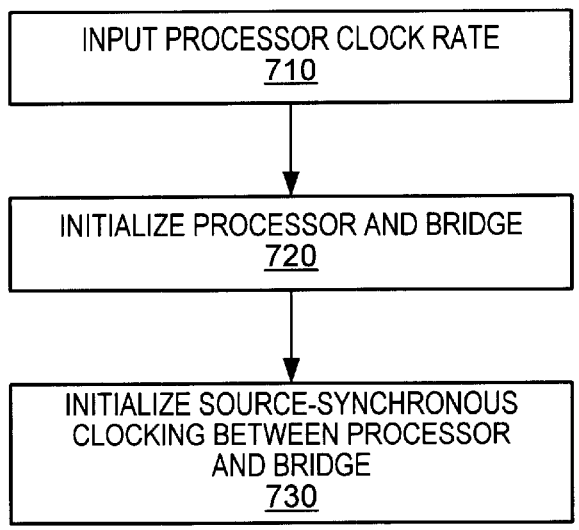
FIG. 7 is a flowchart of an embodiment of a method for initiating operation of the computer system of FIG. 1.

Turning now to FIG. 7, a flowchart of an embodiment of a method for initiating operation of the computer system 100 of FIG. 1 is illustrated. The flowchart, as illustrated, is a high level flowchart and, as such, contains broad descriptions of one embodiment of a method for initiating the operations of the computer system 100. As shown, the method comprises inputting a processor clock rate (step 710), initializing the processor 110A and the bridge 130 (step 720), and initializing source-synchronous clocking between the processor 110A and the bridge 130 (step 730). Details of a preferred embodiment for steps 710, 720 and 730 are given below with respect to FIGS. 8, 9, and 10.

Figure 8:
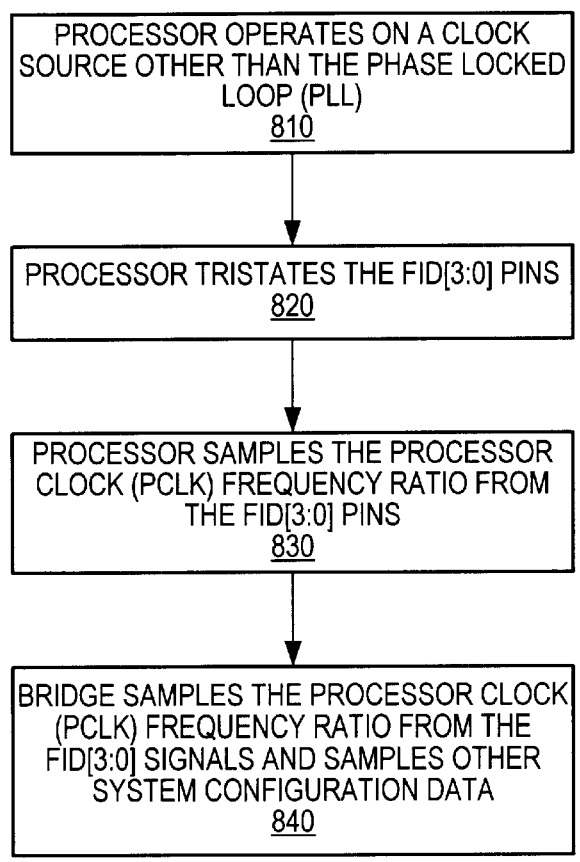
FIG. 8 is a flowchart of an embodiment of a method for inputting the processor clock rate ratio to the processor, such as is shown in FIG. 7.

Turning now to FIG. 8, a flowchart of an embodiment of a method for inputting the processor clock rate ratio to the processor, such as is shown in FIG. 7 at step 710 is illustrated. As shown, the method comprises the processor operating at the system clock frequency rate from a clock source other than the PLL 225 (step 810). The other clock source may include RSTCLK 220, CLKIN 215, or a ring oscillator internal to the processor. It is noted that the other clock frequency may comprise a frequency of, for example, 50 MHz, 100 MHz, or other frequency as desired. It is noted that in various embodiments, the other clock frequency may comprise a relatively slow clock, such that synchronous data transfers may be provided between devices in the computer system 100 at the slow clock frequency.

The method also includes the processor tristating the frequency ID pins FID[3:0] 305 (step 820). The method further includes the processor sampling and decoding the processor clock frequency ratio from the frequency ID pins (step 830). The method also includes the bridge 130 sampling the processor clock frequency ratio from the frequency ID 305 signals, as well as the bridge 130 sampling other system configuration data from other pins or inputs (step 840). In a preferred embodiment, the processor clock frequency ratio is sampled from different signal lines by the processor and the bridge. The processor clock frequency ratio decoded is the same in this preferred embodiment.

It is noted that the frequency ID pins FID[3:0] 305 may be dedicated pins or dual use pins, as desired. It is also noted that the frequency ID pins 305 may provide the same signal to both the processor 110A and the bridge 130 through the same pins or through differing pins for each device. Likewise, the additional system configuration data sampled by the bridge in step 840 may be through the use of dedicated pins or signal line or multiple use pins or signal lines, as desired.

Figure 9:
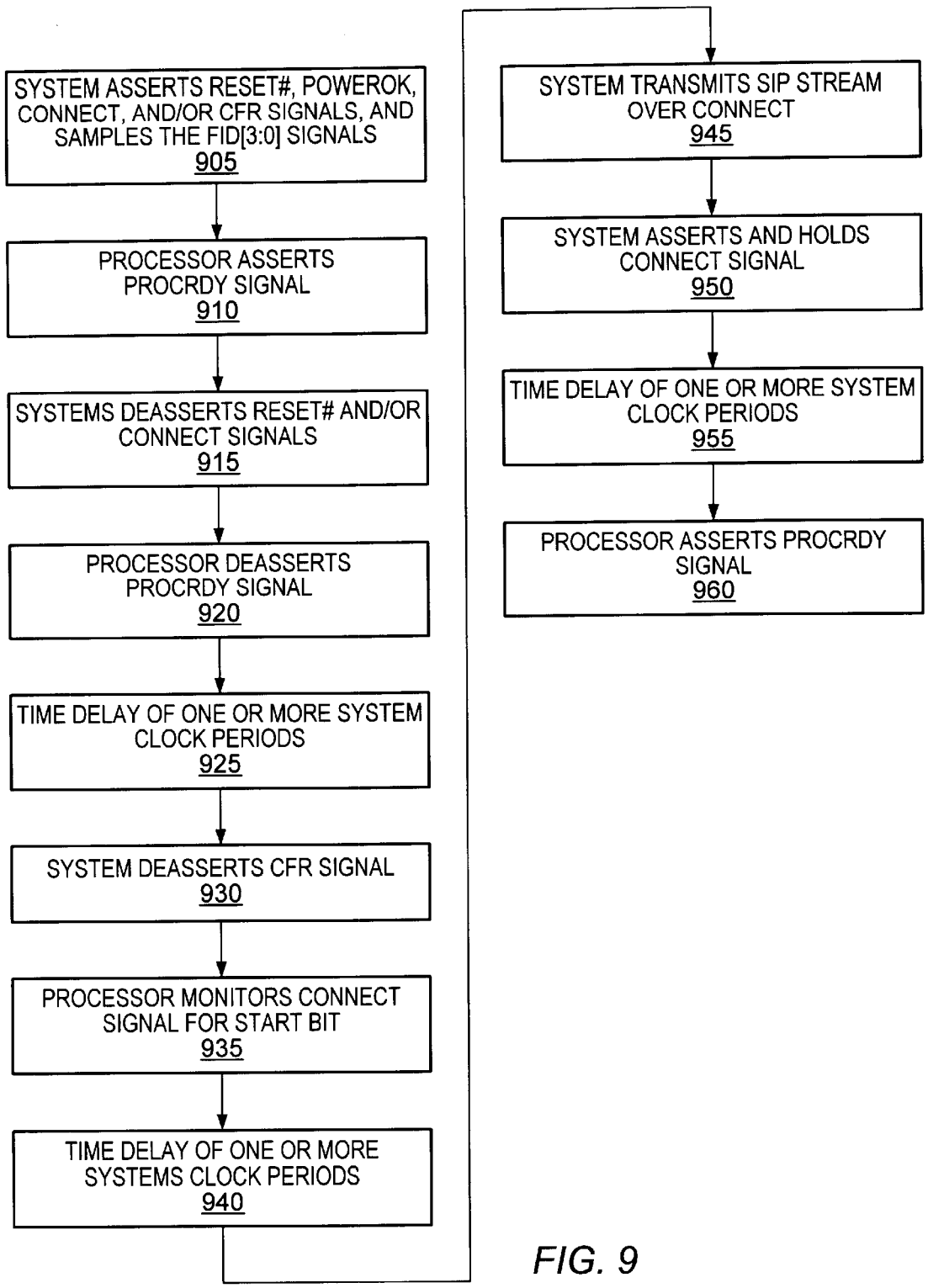
FIG. 9 is a flowchart of an embodiment of a method for initializing the processor using a SIP stream.

Turning now to FIG. 9, a flowchart of an embodiment or method for initializing the processor 110A using a SIP stream is illustrated. The method illustrated in FIG. 9 may, for example, be step 720 of the method of FIG. 7.

The method comprises system asserting the reset# signal 310, the PowerOK signal 303, the connect line 320, and/or the CFR signal 325 (step 905). The method also comprises a processor asserting the PROCRDY signal line 330 (step 910). The method next includes the system deasserting the reset# signal 310 and/or the connect signal 320 (step 915). The processor deasserts the PROCRDY signal 330 (step 920). A time delay of one or more system clock periods may optionally occur (step 925).

The system deasserts the CFR signal 325 (step 930). The processor monitors the connect signal 320 for the start bit (step 935). An optional time delay of one or more system clock periods may occur (step 940).

The system transmits the serial SIP stream over the connect signal line 320 (step 945). The system next asserts and holds the connect signal line 320 (step 950). An optional time delay of one or more system clock periods may occur (step 955). The processor asserts the PROCRDY signal 330 (step 960), preferably to indicate that the processor 110A is ready for operation.

It is noted in step 905 that the reset# signal 310 may not be latched by the processor until the PowerOK signal 303 is received. The system sends the CONNECT 320 or CFR 325 signals concurrently with or within a very short time after sending the PowerOK signal 303.

It is noted in step 910 that when the processor asserts the PROCRDY signal 330, that the processor may at this time, in one embodiment, convert from running at the system clock frequency to the processor clock frequency. This changeover may occur as a slow ramp-up in the PLL 225. When the processor is operating at the processor frequency, instead of the system clock frequency, the processor will deassert the PROCRDY signal 330 in step 920.

Figure 10:
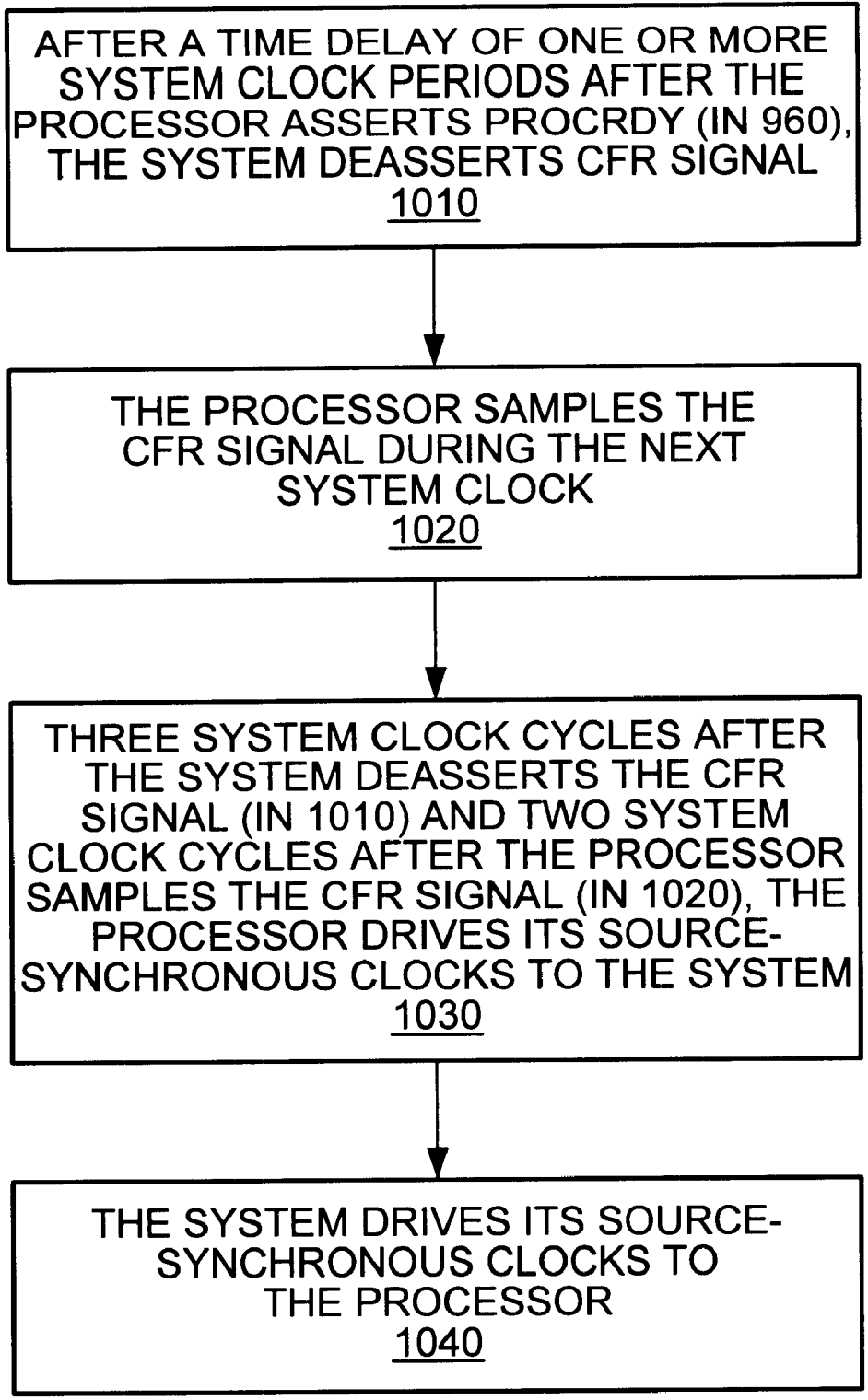
FIG. 10 is a flowchart of an embodiment of a method for initializing source-synchronous clocking between one of the processors and the bridge of FIG. 1.

Turning now to FIG. 10, a flowchart of an embodiment of a method for initializing source-synchronous clocking between one of the processors and the bridge of FIG. 1 is illustrated. While the processor 110A is operating at the system clock frequency, either RSTCLK 220 or CLKIN 215, transfers between the processor 110A and the bridge 130 are synchronous transfers at the RSTCLK 220 or CLKIN 215 frequency. The method of FIG. 10 converts transfers between the processor 110A and the bridge 130 from synchronous transfers to source-synchronous transfers, also known as clock forwarded transfers.

As shown, the method comprises that after a time delay of one or more system clock periods after the processor asserts PROCRDY 330 in step 960, the system deasserts clock forward reset 325 signal (step 1010). The processor samples the CFR signal 325 during the next system clock (step 1020). Three system clock cycles after the system deasserts the CFR 325 signal in step 1010, and two system clock cycles after the processor samples the CFR signal in step 1020, the processor drives its source-synchronous clocks to the system (step 1030). The system drives its source-synchronous clocks to the processor (step 1040).

It is noted that in a preferred embodiment the processor drives its source-synchronous clocks to the system concurrently with the system driving its source-synchronous clocks to the processor.

Figure 11:
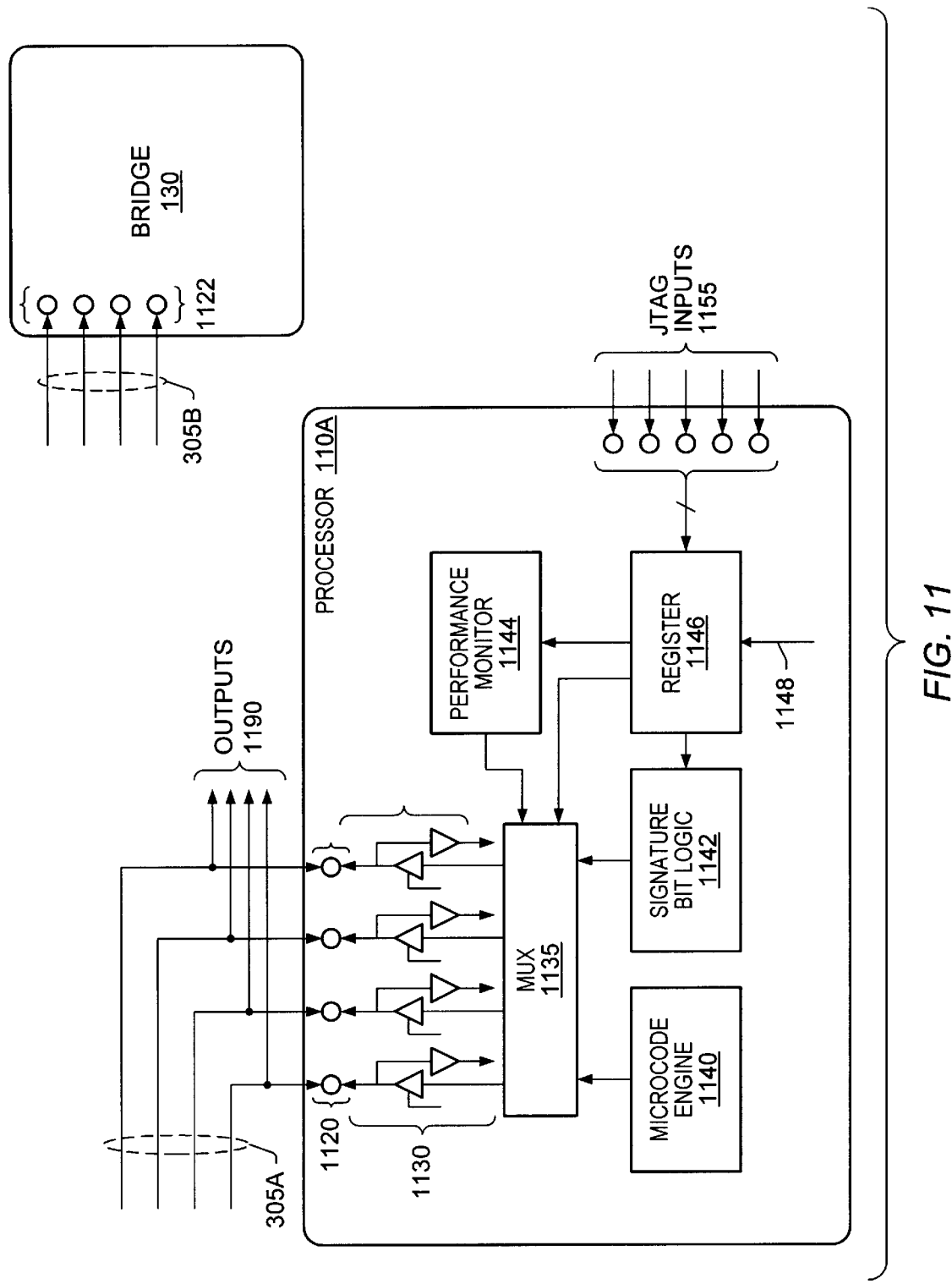
FIG. 11 is a block diagram of an embodiment of a system using dual-use pins for initializing an operating frequency for a processor.

Turning now to FIG. 11, an embodiment of a system using dual-use (e.g. multiplexed) connections ("pins") for initializing an operating frequency for a device, such as a processor 110A, is shown. A representative processor 110A and the bridge 130 are shown each coupled to receive input signals 305A and 305B, respectively. Signals 305A and 305B preferably encode the operating frequency ratio, described herein as FID[3:0]. It is also noted that other operating parameters besides the operating frequency ratio FID[3:0] may be provided to the device.

As shown, four signals 305A are each coupled to one of the pins/connections 1120. The signals 305A are also shown tapped as outputs 1190. Four signals 305B are each coupled to one of the pins/connections 1122.

Signals 305A connect to the processor 110A at a plurality of pins 1120. Each of the signals 305A is preferably either at a high voltage of Vcc or a lower voltage of Vss. The input signals 305A are input through input/output drivers 1130. Referring back to FIG. 3, preferred embodiments for the input signals include FID[3:0] 305A and 305B. One embodiment of the source of signals 305A and 305B is shown below in FIG. 12.

In one embodiment, the FID[3:0] signals 305A and 305B are sampled during a "warm" reset. Thus, the encoded frequency ratio is input to the processor 110A and the bridge 130 upon each warm reset. In another embodiment, signals 305A and 305B are sampled during a "cold" reset. Thus, the encoded frequency ratio is input to the processor 110A and the bridge 130 upon each cold reset. In still another embodiment, signals 305A and 305B are sampled during both warm and cold resets. It is noted that signals 305A and 305B may be sampled at other predetermined times, as desired.

The dual-use nature of the pins 1120 is illustrated in the embodiment of FIG. 11 with the output multiplexer 1135 coupled to the output side of the input/output drivers 1130. Various inputs are possible to the multiplexer 1135, including, as shown, signals from the microcode engine 1140, output of the signature bit logic 1142, outputs from a performance monitor 1144, and values stored in one or more registers 1146. As shown, stored values in one or more registers 1146 may also be input to the signature bit logic 1142 and the performance monitor 1144, as desired. JTAG inputs 1155 may be used to input values to the one or more registers 1146, as well as other inputs 1148. Although several output signal sources are shown internal to the processor 110A, in various embodiments any one or more of the sources is coupled to be output through the pins 1120 as output signals 1190.

It is noted that in the illustrated embodiment, output signals 1190 are only different from the FID[3:0] signals 305A when the input signals are overdriven by the output side of the input/output drivers 1130. Otherwise, the output signals 1190 are the same as the FID[3:0] signals 305A. In other words, the values of the output signals 1190 are the same as the values of signals 305A, unless the input signals 305A are overdriven by the output side of the input/output drivers 1130. A typical output signal 1190 may represent the number of internal breakpoints that the processor 110A has encountered in a predetermined period of time. Other encoded representations are also contemplated, with several more described below.

In one embodiment, the microcode engine 1140 may be configured to output one or more signals that are encoded. The encoded signal may represent any of a number of operating parameters that describe the operating status of the microcode engine 1140. For example, the encoded signal may represent the number of branches taken since that previous edge of RSTCLK 220. Other operating parameters may also be encoded and output as desired.

In another embodiment, the internal states of the various components are logically ANDed and ORed together in a deterministic way by the signature bit logic 1142 to yield an encoded value representative of the internal state of the processor 110A. These signature bits may be useful in functionally redundant systems to verify that redundant processors 110 are functionally running in lock-step. The Boolean equations encoded logically may be predetermined and hardwired into the signature bit logic 1142.

In yet another embodiment, the performance monitor 1144 outputs an encoded signal representing any of a number of operating parameters that describe the operating status of the processor 110 or its related components. For example, the performance monitor 1144 may be configured to output an encoded signal representing the number of L2 cache hits or misses in a predetermined period of time.

In still another embodiment, values stored in one or more registers 1146 may be output to the multiplexer 1135 for output as output signals 1190. In other embodiments, the values stored in the one or more registers 1146 may be output to the multiplexer 1135 to select between other values being input to the multiplexer 1135, such as from the microcode engine 1140, the signature bit logic 1142, or the performance monitor 1144. It is noted that values input to the one or more registers 1146 may be input through software through input 1148 or through the JTAG inputs 1155. As shown, the five JTAG mode 2 input pins 1155 may be used to input values into the one or more registers 1146.

The JTAG inputs 1155 are used during test configurations to input test conditions for tests from the Joint Test Action Group (JTAG), standardized as IEEE Standard 1149.1-1990, IEEE Standard Test Access Port and Boundary-Scan Architecture. Each IEEE 1149.1-compatible device has two pins for control (TCK, TMS), one pin for input (TDI), and one pin for output (TDO). Mode 2 includes an optional fifth pin as a reset pin (TRST). An instruction register, a controller, and an optional data register are also part of the testing methodology. Additional and updated details may be found in IEEE Standard 1149.1a-1993 and IEEE Standard 1149.1b-1994. IEEE standards are available from the Institute for Electrical and Electronics Engineers, Inc. of Piscataway, N.J. 08855-1331.

As an example of encoding, consider the case where the FID[3:0] signals 305A and 305B are Vcc, Vcc, Vss, and Vss, respectively. This encoding of "1100" may indicate to the processor 110A and the bridge 130 that the processor 110A will operate with a frequency multiplier of 6.0. Thus, the processor 110A will operate at a frequency (PCLK 230) equal to CLKIN 215 multiplied by the frequency multiplier of 6.0. If CLKfN 215 is 100 MHz, then PCLK 230 will be 600 MHz.

It is noted that although the embodiment illustrated in FIG. 11 shows signals 305A and 305B as being physically separate, the only requirement is for signal 305A and signal 305B to have the same values. It is not required for signal 305A to be physically separate from signal 305B as shown. In a preferred embodiment, input pins 1120 and 1122 are transparently sampled after the POWEROK signal 303 goes high (e.g. step 905 in FIG. 9) until the first deassertion of the RESET# signal 310 (e.g. step 915 in FIG. 9).

Figure 12:
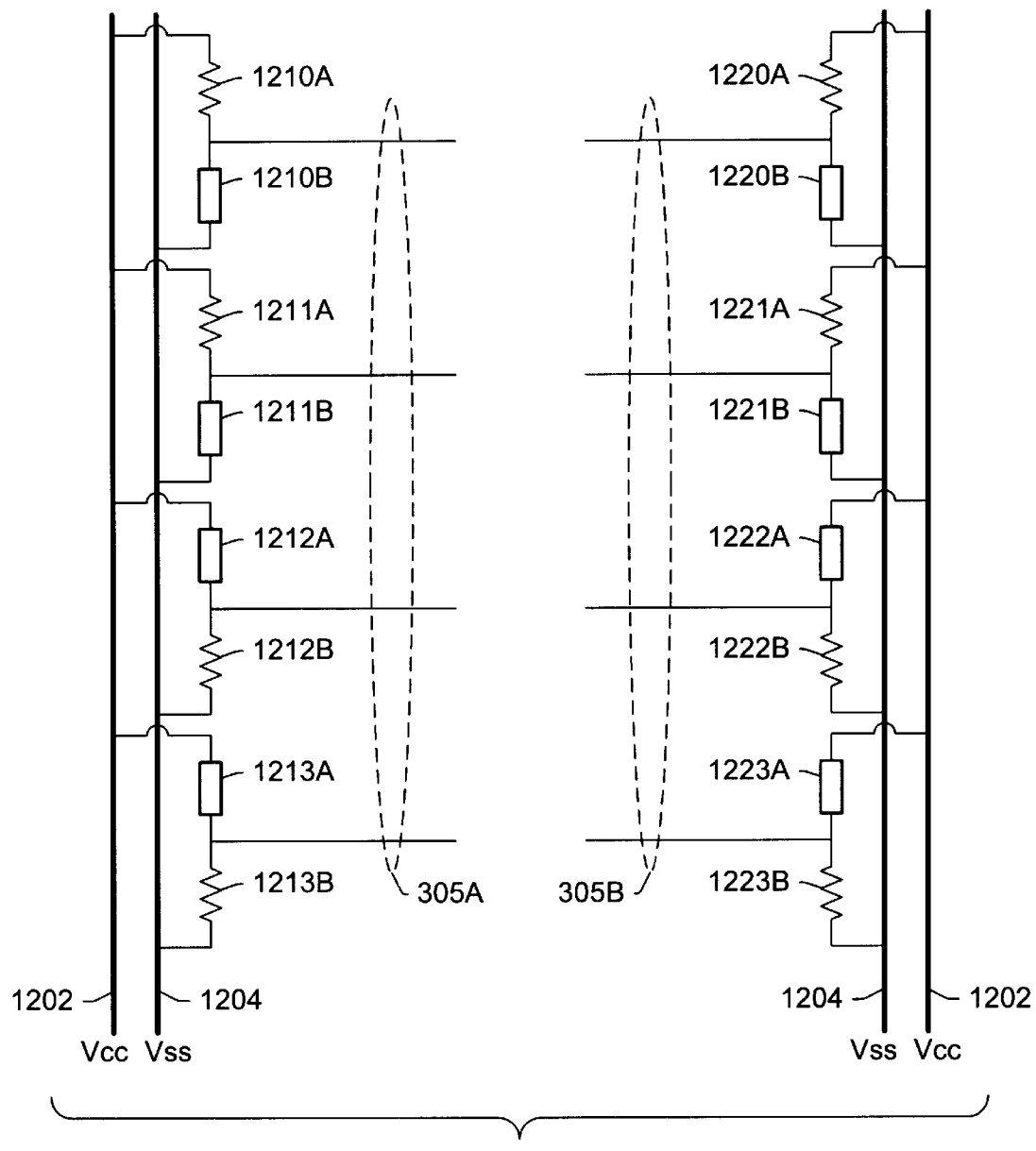
FIG. 12 is a block diagram of an embodiment of how the dual-use pin sets could be connected to Vcc and Vss to supply the frequency ratio bits to the processor and the bridge.

FIG. 12 illustrates a block diagram of an embodiment of how the dual-use pin sets could be connected to Vcc and Vss to supply the frequency ratio bits to the processor and the bridge. Only one embodiment is shown, although other embodiments are contemplated. As shown, FIG. 12 includes a plurality of possible positions for resistors 1210, 1211, 1212, 1213, 1220, 1221, 1222, and 1223 coupled between Vcc 1202 and Vss 1204 and either a processor 110 or a bridge 130. In the illustrated embodiment, resistor locations 1210A, 1211A, 1212B, 1213B, 1220A, 1221A, 1222B, and 1223B are populated with resistors, while locations 1210B, 1211B, 1212A, 1213A, 1220B, 1221B, 1222A, and 1223A are empty. Thus, signals 305A and 305B are Vcc, Vcc, Vss, and Vss, respectively, an encoding of "1100".

Figure 13A:
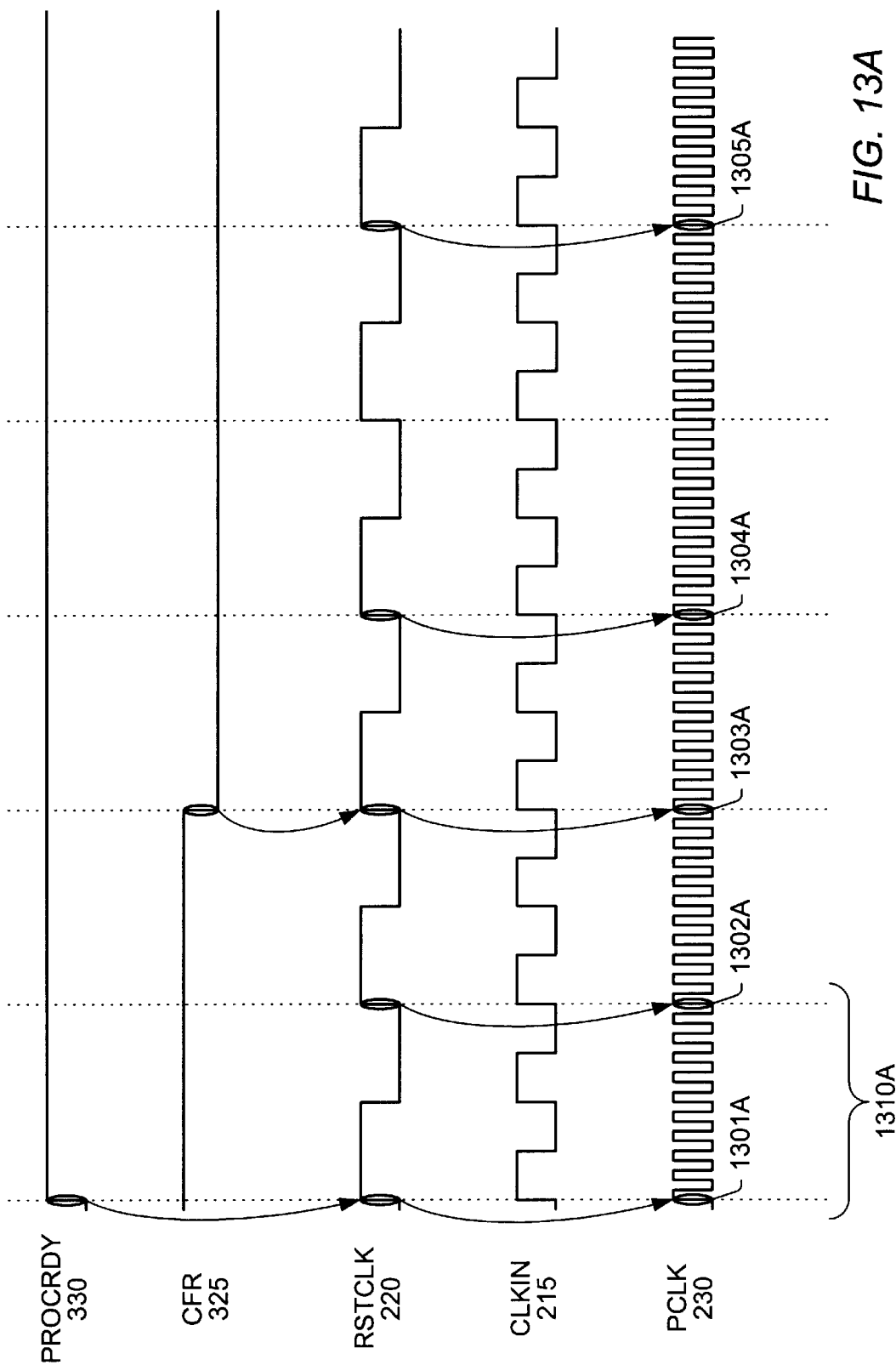
FIG. 13A is an exemplary timing diagram of an embodiment of operations according to the flowchart of FIG. 10 when the sending device is clocked at base clock rate that is twice that of the receiving device.
Figure 13B:
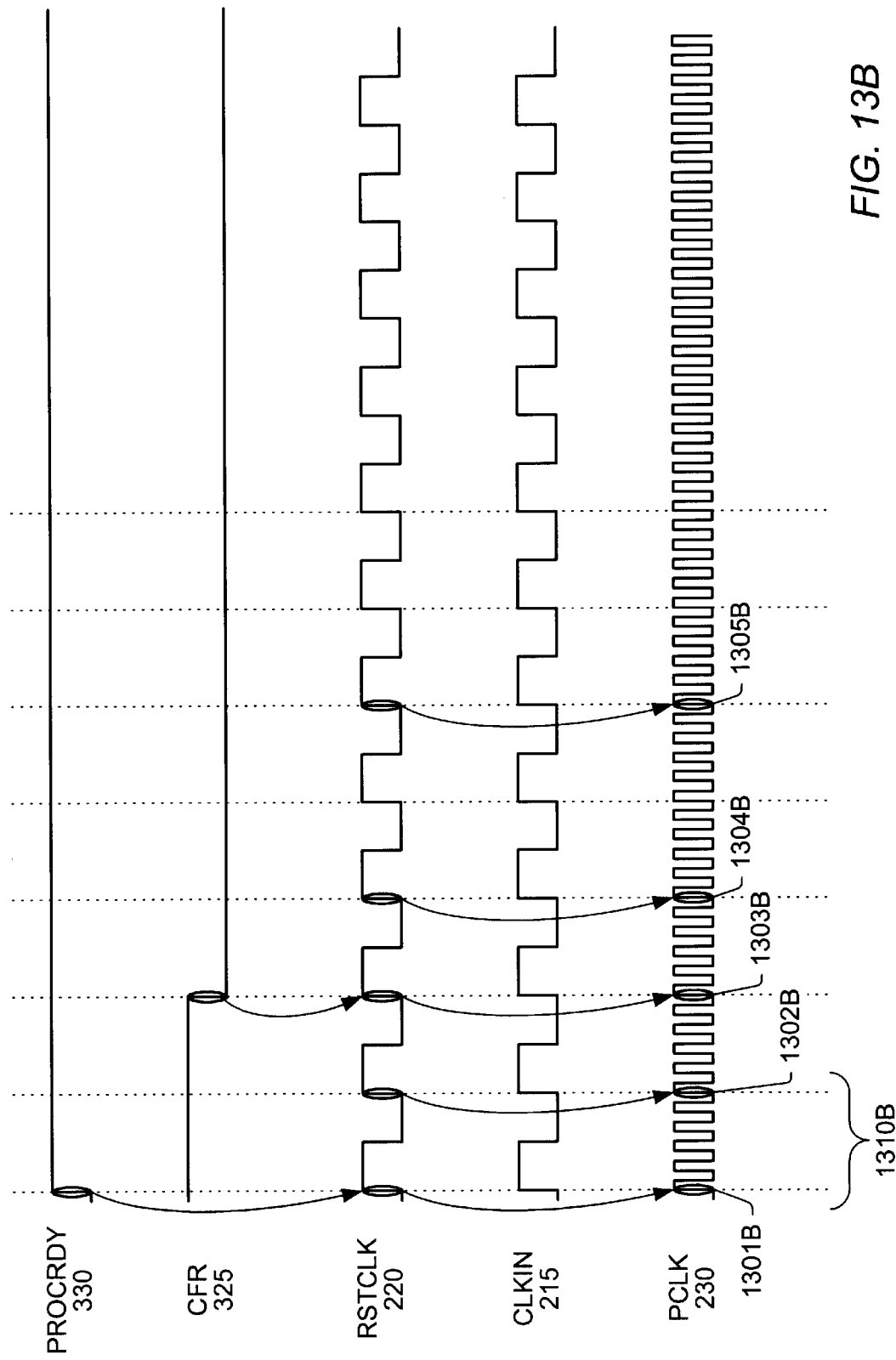
FIG. 13B is an exemplary timing diagram of an embodiment of operations according to the flowchart of FIG. 10 when the sending device is clocked at base clock rate that is equal to the receiving device.

FIGS. 13A and 13B illustrate exemplary timing diagrams of an embodiment of operations of a system such as is shown in FIGS. 3 and 4, when a processor and a bridge initiate exchanging source-synchronous clocks. Shown in FIG. 13A are signals PROCRDY 330, CFR 325, RSTCLK 220, CLKIN 215, and PCLK 230. As shown, RSTCLK 220 and CLKfN 215 operate according to clock rates having a ratio of 1:2. In other words, CLKIN 215 is twice as fast as RSTCLK 220, and the ratio bit value corresponds to this value of two. PCLK 230 is illustrated with a clock rate 5 times the rate of CLKIN 215. This value of 5 corresponds to the decode of the processor clock ratio FID[3:0].

On a rising edge of RSTCLK 220 and CLKIN 215, the processor asserts PROCRDY 330 (reference numeral 1301A). The assertion of PROCRDY 330 by the processor may correspond to step 960 in FIG. 9. On a next rising edge of RSTCLK 220, the bridge samples PROCRDY 330 as asserted (high) (reference numeral 1302A). The sampling of PROCRDY 330 by the bridge may correspond to step 960 in FIG. 9 and/or step 1010 in FIG. 10. Note that the number of rising edges of PCLK 230 between the rising edge denoted with reference numeral 1301A and the rising edge denoted with reference numeral 1302A is known. The processor may configured to calculate the proper rising edge of PCLK 230 that corresponds to the rising edges of RSTCLK 220 and/or CLKIN 215. The number of rising edges of PCLK 230 between rising edges of CLKIN 215 is given by the processor frequency ratio FID[3:0]. The number of rising edges of PCLK 230 between rising edges of RSTCLK 220 is given by the product of the processor frequency ratio FID[3:0] and the value of the ratio bit. As shown, there are [5×2=]10 rising edges of PCLK 230 between rising edges of RSTCLK 220. Thus, the processor must wait for 10 rising edges of PCLK 230 for the next rising edge of RSTCLK 220 (reference numeral 1310A).

After a time delay of one or more clock periods of a system clock, such as RSTCLK 220, the bridge deasserts CFR 325 (reference numeral 1303A). As shown, the bridge deasserts CFR 325 on the rising edge of PCLK 230 corresponding to the next rising edge of RSTCLK 220. This action may correspond to step 1010 in FIG. 10.

The processor samples the CFR signal 325 as low on the rising edge of PCLK 230 that corresponds to the next rising edge of RSTCLK 220 (reference numeral 1304A). This action may correspond to step 1020 in FIG. 10. On the rising edge of PCLK 230 that corresponds to the second rising edge of RSTCLK 220 since the processor sampled CFR 325 as low, the processor begins driving source-synchronous clocking signals to the bridge (reference numeral 1305A). This timing corresponds to exactly three rising edges of RSTCLK 220 since the bridge deasserted CFR 325. This action may correspond to step 1030 in FIG. 10. In one embodiment, the bridge begins driving source-synchronous clocking signals to the processor on the same rising edge of RSTCLK 220.

Numerous variations and modifications will become apparent to those skilled in the art once the above disclosure is fully appreciated. It is intended that the following claims be interpreted to embrace all such variations and modifications.

What is claimed is:

1. A method for initializing deterministic data transfers between a first device and a second device, wherein the first device operates according to at least a first clock having a first clock rate, wherein a second device operates according to at least a second clock having a second clock rate, wherein a ratio between the second clock rate and the first clock rate is an integer number greater than or equal to one, the method comprising:

the first device receiving a serial data stream in one or more synchronous data transfers, wherein the serial data stream includes at least one ratio bit, wherein the at least one ratio bit is encoded with the ratio between the second clock rate and the first clock rate;

the first device using the ratio bit to determine an edge of the second clock; and the first device transmitting a first source-synchronous clock to the second device on the edge of the second clock.

2. The method of claim 1, further comprising:

the second device signaling the first device, wherein said signaling indicates that the second device is ready to receive source-synchronous data transfers.

3. The method of claim 1, further comprising:

the second device receiving the first source-synchronous clock.

4. The method of claim 1, further comprising:

the second device transmitting a second source-synchronous clock to the first device on the edge of the second clock.

5. A computer system, comprising:

a memory configured to store initialization information for said computer system, wherein said initialization information includes at least one ratio bit, wherein said at least one ratio bit is encoded with a ratio between a second clock rate and a first clock rate;

logic coupled to said memory for transmitting said initialization information;

at least one processor coupled to receive a first system clock operating at said first clock rate and a second system clock operating at said second clock rate, wherein said at least one processor is configured to operate according to said second system clock, wherein the ratio between said second clock rate and said first clock rate is an integer number greater than or equal to one, wherein said at least one processor is further coupled to said logic with a serial line over which to receive said initialization information in one or more synchronous data transfers; and a device coupled to the at least one processor, wherein the device is configured to operate at the first clock rate;

wherein said logic is configured transmit said initialization information over said serial line to said at least one processor, wherein said processor is further configured to decode said ratio bit to determine said first clock rate;

wherein the device and the at least one processor are further configured to exchange data using source-synchronous clocks, wherein the device and the at least one processor are further configured to initialize said source-synchronous clocks using the ratio bit to determine a common clock edge.

6. The computer system of claim 5, wherein said logic is configure to operate according to said first clock rate, and wherein said logic is configured to transmit said initialization information at said first clock rate.

7. The computer system of claim 5, wherein said at least one processor is further configured to operate at a fast clock rate, wherein the ratio between said fast clock rate and said second clock rate is an integer greater than or equal to one.

8. The computer system of claim 5, further comprising:
a bridge that includes said memory and said logic.

9. The computer system of claim 5, wherein said device is a system bridge.

* * * * *

UNITED STATES PATENT AND TRADEMARK OFFICE
CERTIFICATE OF CORRECTION

PATENT NO.   : 6,584,575 B1                                        Page 1 of 1
DATED         : June 24, 2003
INVENTOR(S)  : Meyer et al.

It is certified that error appears in the above-identified patent and that said Letters Patent is hereby corrected as shown below:

<u>Title page,</u>
Item [54], Title, please change the title to: -- SYSTEM FOR INITIALIZING SOURCE-SYNCHRONOUS DATA TRANSFERS USING RATIO BITS IN AN INITIALIZATION INFORMATION. --

Item [75], Inventors, please change the inventor's name to -- Derrick R. Meyer --

Signed and Sealed this

Twenty-fourth Day of February, 2004

JON W. DUDAS
*Acting Director of the United States Patent and Trademark Office*